Nov. 4, 1941.   H. R. CANFIELD   2,261,714
ELECTRIC SPOT WELDING SYSTEM
Filed Feb. 20, 1939   2 Sheets-Sheet 1

INVENTOR.
Harry R. Canfield

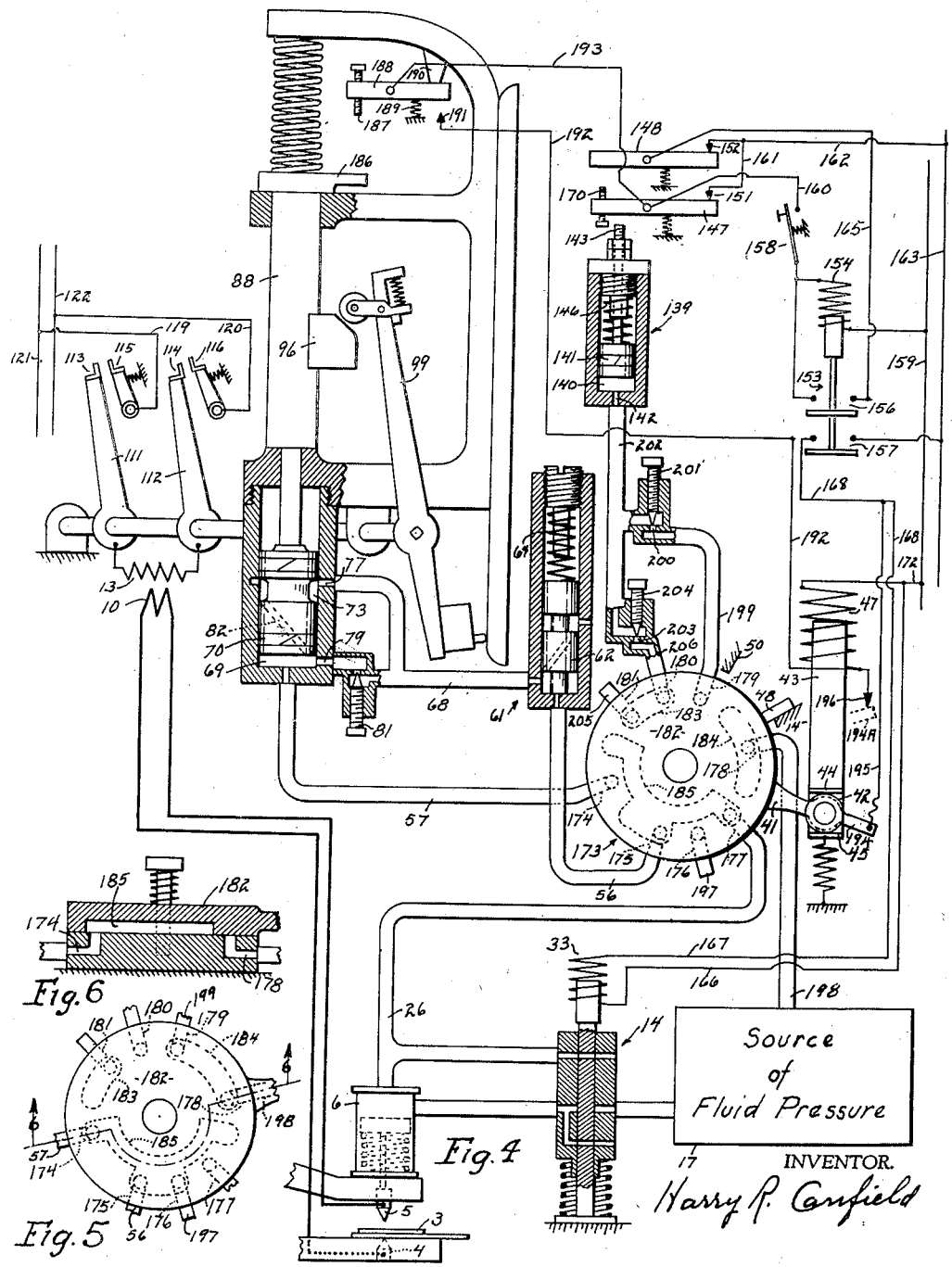

Patented Nov. 4, 1941

2,261,714

UNITED STATES PATENT OFFICE 2,261,714

ELECTRIC SPOT WELDING SYSTEM

Harry R. Canfield, Cleveland, Ohio, assignor to The Clark Controller Company, Cleveland, Ohio, a corporation of Ohio Application February 20, 1939, Serial No. 257,302

3 Claims. (Cl. 200—82)

This invention relates to electric welding systems and particularly to spot welding systems of the class in which electrodes are pressure-engaged with work to be welded, and electric current of timed duration is caused to flow through the electrodes and the work to effect a weld thereat.

In systems of this class, it is desirable for the operative elements to be under the control of an operator and to function in such manner that he may cause a single weld to be made or a rapid succession of welds optionally.

It is also desirable that after a weld is made, the electrodes will be held in pressure-engagement with the work for a time interval during which the weld may set, such interval being referred to as a cold-hold time interval.

It is also desirable in such systems that a time interval be interposed between successive welds, such time interval being sometimes referred to as a delay interval, to control the frequency of successive welds.

Systems of this class have been proposed comprising an electric contactor operated by fluid pressure, such as compressed air, for timing the welding current, and in such cases it is desirable that the current timing contactor shall not operate until after a desired pressure has been attained between the electrodes and the work, and that the contactor shall not operate except at operating fluid pressure of a suitable pressure value, to insure positive uniform operations thereof.

The present invention comprises elements and the functions thereof by which the foregoing desirable results are attained in an improved manner.

It is therefore among the objects of the invention:

To provide generally an improved welding system of the spot-welding type;

To provide in a welding system of the class referred to an improved air operated contactor for timing the welding current; improved means for introducing a delay time interval between successive welds; improved means for introducing a cold-hold time interval after each weld; improved means for delaying the operation of the fluid pressure-operated welding current timing contactor until the fluid operating pressure thereat has attained a predetermined value; means by which a single weld or a rapid succession of welds may be performed; and improved means for quickly exhausting and resetting the fluid pressure operated welding contactor; and these functions singly, or in combination of any two or more.

Other objects will be apparent to those skilled in the art to which my invention appertains.

My invention is fully disclosed in the following description taken in connection with the following drawings in which:

Fig. 4 is a view similar to Fig. 1, but illustrating a modification of the invention;

Fig. 5 is a view illustrating, in operated position, parts which are illustrated in normal position in Fig. 4;

Fig. 6 is a sectional view taken from the plane 6—6 of Fig. 5.

Figures 1, 2, 3:
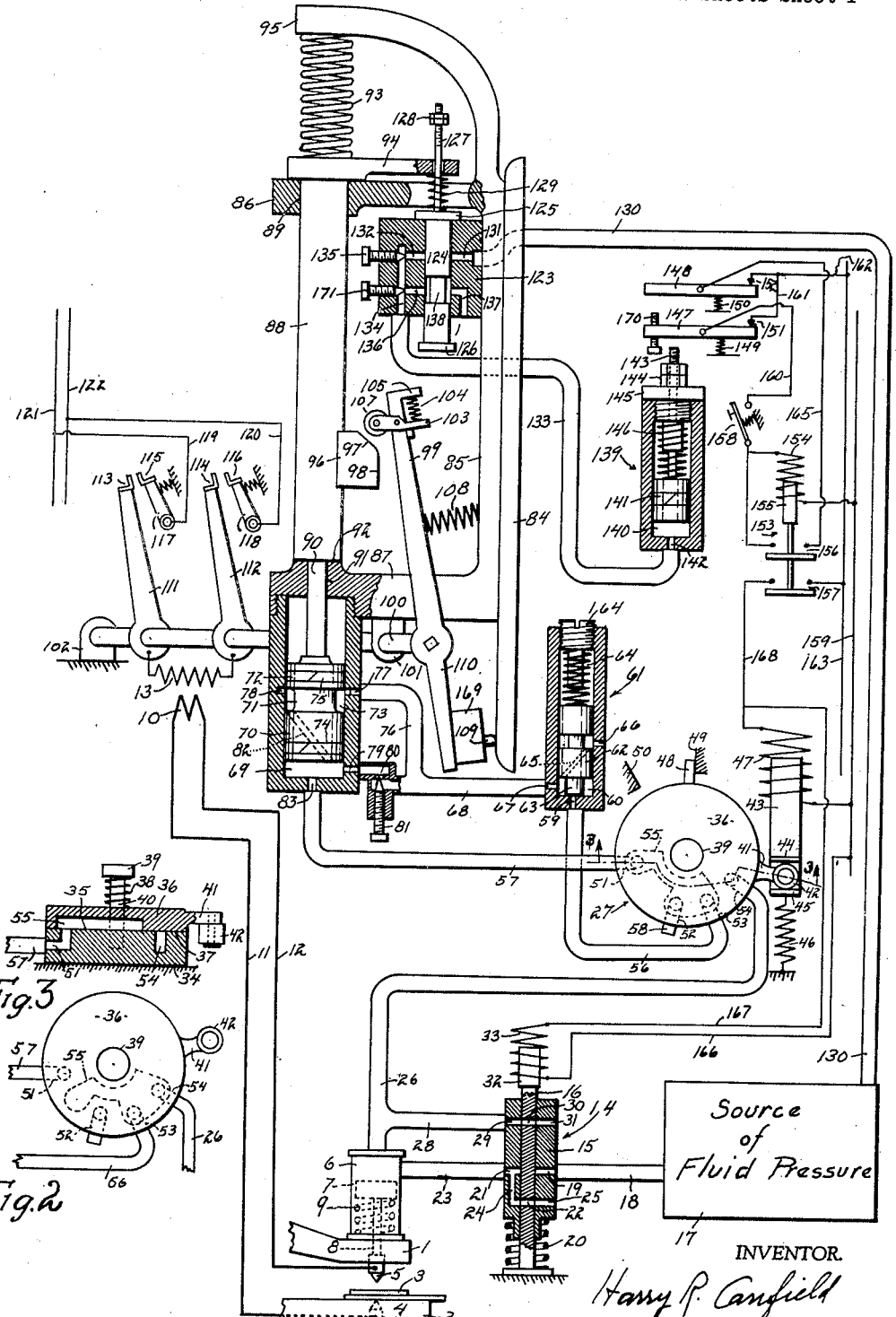
Fig. 1 is a diagrammatic representation of the elements of a welding system embodying my invention in one form.
Fig. 2 is a fragmentary view illustrating, in operated position, parts illustrated in Fig. 1 in normal position.
Fig. 3 is a fragmentary sectional view taken from the plane 3—3 of Fig. 1.

Referring to the drawings, Figs. 1 to 3, inclusive, I have illustrated generally at 1 and at 2 the upper and lower heads respectively of a welding machine, the lower head having work pieces 3 thereon to be welded. The lower head 2 has associated therewith a lower electrode 4 which may be stationary, and the upper head 1 has associated therewith an electrode 5 arranged to be reciprocated toward and from the work 3 to pressure-engage the work between the electrodes. The means diagrammatically illustrated comprises a fluid pressure cylinder 6 having therein a piston 7 and a piston rod 8 connected to the electrode 5. The piston is arranged to be reciprocated downwardly by fluid pressure in the cylinder 6 above the piston and to be reciprocated upwardly by a spring 9 in the cylinder.

An electric transformer secondary 10 has the terminals thereof connected to the electrodes 5 and 4 by wires 11 and 12 and the secondary is arranged to be energized by the transformer primary 13 in a manner to be described.

A magnetic valve device shown generally at 14 is provided comprising a stationary valve housing 15 and a reciprocable valve plunger 16 reciprocating in a suitable bore therein. A source of fluid pressure is diagrammatically illustrated at 17 and will be understood to comprise a reservoir of fluid under pressure, such as compressed air, and any means for maintaining pressure in the reservoir; and the source 17 communicates fluid pressure by a conduit 18 to a duct 19 in the valve housing 15. When the valve device is in the normal position shown the duct 19 is cut off by the plunger 16, but when the plunger 16, which is held downward by the spring 20, is raised to an upper position by means to be described, the duct 19 communicates with a duct 21 through a duct 22 in the valve plunger 16 and the fluid pressure is thereby communicated to a conduit 23 and thence to the cylinder 6 above the piston 7.

In the position of the valve plunger 16 illustrated, the cylinder 6 is exhausted backward by way of the conduit 23, the duct 21, a branch duct 24 through the said duct 22 and out by an exhaust duct 25.

Communicating with the cylinder 6 above the piston 7 is a conduit 26 leading to a rotary or oscillatory magnetic valve 27 which will presently be described, and inasmuch as the conduit 26 may be of substantial length, it is desirable in some cases to exhaust it and to this purpose, a branch duct 28 leads from the conduit 26 to a duct 29 in the housing 15 which, in the normal position of the plunger illustrated, communicates through a duct 30 in the plunger 16 to an exhaust duct 31, in alignment therewith.

The exhaust at 31 is cut off as is the exhaust at 25 when the plunger 16 is raised to admit fluid pressure, as described, to the cylinder 6.

A magnetic plunger 32 is connected to the upper end of the valve plunger 16 and an electro-magnetic winding 33 is provided which, when energized, raises the valve plunger 16 in a manner which will be understood, against the tension of the spring 20.

The magnetic valve 27 comprises a stationary base 34 having a planar surface 35 and an oscillatable valve head 36 having a planar face 37, mutually engaged with the face 35 and held in fluid pressure sealing relation therewith by a spring 38 reacting at one end upon the head 36 and at the other end upon a head 39 of a bolt, the shank 40 of which passes through the head 36 and into the base 34.

The shank 40 thus provides a central pivot upon which the head 36 may be oscillated and the means for oscillating it comprises an arm 41 extending laterally from the head and a roller 42 thereon, and a magnetic plunger 43 having upper and lower fingers 44 and 45 engaging upper and lower sides of the roller 42 respectively, the plunger being arranged to be reciprocated downwardly by a spring 46 stationarily anchored at its lower end and at its upper end secured to the lower end of the plunger 43 and the plunger 43 being arranged to be reciprocated upwardly by an electro-magnetic winding 47, when energized.

The head 36 is held oscillated in the clockwise direction as viewed in Figs. 1 and 2 by the spring 46 and is stopped in a normal position by the engagement of a finger 48 on the head 36 with a stationary stop 49, and in the operated or counter-clockwise position by a stop 50.

The base 34 has, in the embodiment under discussion, four ducts, 51, 52, 53 and 54 extending inwardly radially from the periphery of the base 34 and then upwardly and opening at the said face 35 thereof. The head 36 has a recess 55 therein so formed that, as illustrated in the drawings, when the head 36 is in its normal position of Fig. 1, recess 55 overlaps the upper ends of the ducts 51, 52 and 53 and so that when it is in its operated position, illustrated in Fig. 2, the recess 55 overlaps the ducts 53 and 54.

The said conduit 26 is connected to the said duct 54. Conduits 56 and 57 are connected respectively to the ducts 53 and 51. An exhaust conduit 58 is connected to the duct 52.

The said conduit 56 leads to a duct 59 in the lower end of the cylinder 60 of a minimum pressure device designated generally at 61, and within the cylinder 60 reciprocates a piston valve 62, the lower end of which is of reduced diameter as at 63. The extreme lower end of the reduced diameter portion normally covers and closes the duct 59. A spring 64 reacting at the lower end upon the valve 62 and at its upper end upon an adjustable screw 164, holds the piston in duct closing position with a predetermined adjustable amount of pressure.

By this means, when pressure in the conduit 56, which is a rising pressure, as will be described, is below a predetermined value, the duct 59 is held closed, but when the pressure attains the predetermined value, the piston 62 is raised, opening the duct 59. Upon opening it, the full area of the piston 62 is exposed to the pressure and the piston moves upwardly with a quick jump-action, fully opening the duct 59 and freely admitting fluid pressure to the cylinder 60.

Any leakage through the duct 59 and around the piston end 63, which might otherwise expose the full piston area to the pressure and prematurely raise it, exhausts by leakage through a duct 65 in the piston extending from its under side to its upper side and exhausting to atmosphere at a leakage duct 66.

When the piston 62 is thus raised, the fluid flowing from the conduit 56 into the cylinder 60 flows out therefrom through a duct 67 into a conduit 68. At 69 is the cylinder of a cylinder and piston device for operating a fluid pressure operable electric contactor. A lower piston 70 reciprocates in the cylinder and is joined by a neck 71 to an upper piston 72, providing a space 73 around the neck. Any means may be provided to seal the pistons in the cylinder, the means illustrated comprising piston rings 74 and 75, on the two pistons respectively.

The said conduit 68 communicates by a branch 76 with the space 73 through a duct 77 which may have an annular continuation 78 to equalize the pressure on all sides of the lower piston 70 after it moves to cover this duct 77, as will be described. The conduit 68 also communicates with the cylinder 69 below the lower piston 70 by means of a duct 79, this communication being effected through a flow port 80, the size of which is adjustably regulated and controlled by a needle valve 81.

A duct 82 extending through the lower piston 70 effects communication between the cylinder 69 below the piston and the space 73 around the neck above it.

The conduit 57 communicates with the cylinder 69 below the piston 70 by a duct 83.

By these means, as will presently be described, the cylinder 69 exhausts through the duct 83 and conduit 57, and fluid pressure may be conducted through the conduit 68 and ducts 77 and 79, that through the duct 77 being unrestricted, whereby the fluid under pressure in the conduit 68 flows into the space 73 down through the duct 82 to the cylinder 69 under the lower piston 70, moving the pistons upwardly with a quick jump movement, until the lower piston 70 covers the duct 77. Thereupon the quick movement of the piston stops and the movement is continued by flow through the duct 79, at a generally retarded rate, and in any case, at a rate controlled by the needle valve 81.

This quick initial movement is utilized to close an electric contactor device and the continued generally slower movement is utilized to time the period during which the contactor remains closed to thereby time a welding current impulse, and this will now be described.

A main supporting panel 84 has mounted thereon a frame 85 comprising upper and lower brackets 86 and 87. A plunger 88 reciprocates at its upper end in a bore 89 in the bracket 86 and at its lower end is of reduced diameter, as at 90, providing a piston rod connected to the upper end of the upper piston 72, and the piston rod reciprocates in a bore 91 in the lower bracket 87, the reduction of diameter providing a shoulder 92 functioning as a stop to engage the lower bracket 87 to stop downward movement of the plunger. The plunger is moved upwardly by fluid pressure in the cylinder 69, as briefly referred to above, and is reciprocated downwardly by a spring 93 reacting at its lower end upon an arm 94 on the upper end of the plunger 88 and reacting at its upper end upon an arm 95 connected to or integral with the frame 85.

Mounted on one side of the plunger 88 is a cam 96 having an inclined cam face 97, and a vertical cam face 98. An oscillatory arm 99 is mounted on a shaft 100, the arm and shaft being oscillatable by being supported in a bearing 101, depending from the bracket 87 and by an axially spaced bearing 102 supported in any suitable manner.

The arm 99 has pivoted thereto a finger 103 constrained to rock clockwise by a spring 104 abutting at its upper end upon a lateral extension 105 of the arm 99 and at its lower end upon the finger 103, the finger being stopped in a clockwise movement by an abutment 106 on the arm 99. The opposite end of the finger 103 carries a roller 107, normally in proximity to the cam surface 97.

When the plunger 88 reciprocates upwardly, the cam surface 97 engages the roller 107 and thereby rocks the arm 99 clockwise through an initial angle of movement. Upon continued movement of the cam 96, the roller 107 rolls into engagement with the substantially vertical surface 98 of the cam, maintaining the arm 99 in a clockwise position. At or near the end of the movement of the plunger 88 and cam 96, the roller 107 rolls under the cam and the arm 99 is returned to its original position by a spring 108 abutting at one end upon the frame 85 and at the other end upon the arm 99, which counter-clockwise position is determined by a stop 109 on an extension 110 of the arm 99 below the shaft 100, the stop 109 moving into engagement with the panel 84.

The shaft 100 has mounted thereon a pair of contactor arms 111 and 112, carrying at their upper end contacts 113 and 114. Mounted adjacent to these contacts are stationary contacts 115 and 116 mounted on yieldable arms 117 and 118.

The initial clockwise movement of the arm 99, above referred to, moves the contacts 113 and 114 into engagement with the contacts 115 and 116, and the retaining of the arm 99 in its clockwise position maintains these contacts closed. When the cam 96 releases the arm 99, as described, and the arm 99 returns counter-clockwise, the engaged contacts are opened. The contacts thus remain in engagement for a time period determined by the velocity of the upward movement of the plunger 88.

Wires 119 and 120 are connected respectively to the arms 117 and 118 and to supply mains 121 and 122 and the said primary 13 of the transformer is connected at its opposite terminals to the arms 111 and 112 so that when the contacts 113, 114, 115 and 116 are engaged, the transformer is energized and sends a welding current impulse to the electrodes 4 and 5, above referred to, for a timed period.

At the upper end of the plunger 88 is a valve block 123 in a bore in which is a reciprocable piston valve 124, the downward movement of which is stopped by a flange 125 on the valve engaging the upper side of the block 123 and the upward movement of which is stopped by a flange 126 on the lower end of the valve engageable with the lower side of the block. The valve has a stem 127, on the upper end portion of which is a stop 128, preferably in the form of a pair of lock nuts, engageable by an extension of the arm 94 on the plunger 88. The valve is normally held downwardly by a spring 129 abutting at opposite ends on the arm 94 and upon the flange 125.

A conduit 130, communicating with the source of fluid pressure 127 at one end, communicates at the other end with a duct 131 aligned with a duct 132 in the block 123, the two ducts being normally closed by the valve 124 in its normal lower position illustrated. A conduit 133, to be referred to, communicates with a duct 134 in the block, which duct communicates with the duct 132, under the control of a needle valve 135. The duct 134 also communicates with a duct 136, aligned with an exhaust duct 137, communicating with the atmosphere, the communication of these two ducts being effected around a neck 138 of the valve in its normal position.

When the valve 124 is moved upwardly by movement of the plunger 88, which effects engagement of the arm 94 with the stop 128, communication between the ducts 136 and 137 is cut off and communication between the ducts 131 and 132 is effected, as will be understood.

Illustrated generally at 139, is a delayed operation device comprising a cylinder 140 in which reciprocates a piston 141. The said conduit 133 communicates with the cylinder 140 through a duct 142. The piston 141 has a stem 143 projecting upwardly out of the cylinder, on which is an adjustable stop 144, preferably in the form of lock nuts threaded on the stem, engaging a head 145 on the upper end of the cylinder. The stem is thereby rendered adjustable upwardly and downwardly to adjust the position of the upper end of the stem. A spring 146 holds the piston 141 downwardly, abutting at its upper end upon the head 145 and at its lower end upon the piston.

Above the device 139 is a pair of pivoted contact arms 147 and 148, normally held by springs 149 and 150 into engagement with stationary contacts 151 and 152.

At 153 is a relay device comprising an energizing winding 154, a plunger 155, and contacts at 156 and 157.

Other parts and the functions thereof, including certain electric circuits, not above described, will now be described in connection with a description of the operation of the apparatus as a whole, which follows.

To effect a weld at the work 3, the operator closes an operator's contactor 158 of the normally open type. Thereupon electric control current flows from a supply main 159 through the winding 154 of the relay 153, through the operator's contactor 158, by a wire 160 to the contactor arm 147, through the arm and the contact 151 engaged therewith, and by wires 161 and 162 to the other supply main 163.

The relay device 153 thereupon operates, closing the contacts at 156 and 157, making a maintaining circuit for the winding 154 independently of the operator's contactor, namely from the main 159 through the winding 154, through engaged contacts 156, by a wire 165 to the contactor arm 148, through the arm and engaged contact 152, by the wire 162 to the main 163, whereby the relay device will remain operated. Operation of the relay device effects energization of the winding 47 of the magnetic valve 27, current flowing from the main 159 through the winding 47 and by a wire 168 to the contacts at 157 and to the main 163, causing the plunger 43 to be lifted and thereby moving the head 36 of the valve 27 from the position of Fig. 1 to that of Fig. 2.

At the same time, the winding 33 of the magnetic valve 14 is energized, current flowing from the main 159 by a wire 166 through the winding 33 and by wires 167 and 168 through the contacts 157 to the main 163.

This lifts the valve plunger 16 and thereupon fluid pressure, such as compressed air, from the source 17 flows through the conduit 18, the ducts 19, 22 and 21, which are now aligned, and by conduit 23 into the cylinder 6 above the piston 7, thus forcing the piston 7 and electrode 5 downwardly, engaging the work 3 between the electrodes 4 and 5.

As well understood, in devices of this kind, the fluid pressure expands in the cylinder 6, so that the pressure in the conduit 26 communicating therewith is a rising pressure. The rising pressure in the conduit 26 is communicated to the duct 54, and thence through the recess 55 and duct 53 to the conduit 56 and thence through the duct 59 to the underside of the piston 62.

When this rising pressure attains a value corresponding to the desired pressure at the electrodes, the spring 64 is overcome and the valve 62 is raised, uncovering the duct 59. The full area of the valve 62 is thereby exposed to the pressure and it jumps up immediately so that the fluid pressure in the conduit 56 is communicated to the cylinder 60 and through the duct 67 to the conduit 68. From the conduit 68 the pressure is communicated through the conduit 76 and by way of the duct 77 to the space 73 above the lower piston 70, and thence through the duct 82 to the lower side of the piston, and pushes the piston upwardly with a quick movement, until the lower piston 70 covers the duct 77, whereupon the quick movement stops. This movement is sufficient to cause the cam surface 97 of the cam 96 to engage the roller 107 and rock the arm 99 sufficiently to cause the arms 111 and 112 to move the contacts 113 and 114 into engagement with the contacts 115 and 116, closing the circuit, above described, to the transformer primary 13, energizing it and thereby the transformer secondary 10, causing electric current to flow through the electrodes 4 and 5 and the work 3, to effect a weld thereat.

The fluid pressure in the conduit 68 is also communicated directly to the underside of the lower piston 70 through the flow controlling port 80 and duct 79 and this flow, being controlled by the needle valve 81, effects a retarded continuation of the movement of the piston 70, during which movement the roller 107 is maintained in engagement with the cam surface 98 of the cam 90, holding the said contacts closed.

After a predetermined time interval determined by the adjustment of the needle valve 81, the cam 96 leaves the roller 107 and the arm 99 under the impulsion of the spring 108 and returns counterclockwise, which effects opening of the said contacts and terminating of the welding current impulse.

While the continued movement of the plunger 88 thus effected may, in some cases, be relatively slow, in which case the roller 107 will remain in contact with the cam surfaces 97 and 98, the movement, in some cases, may be very rapid, corresponding to a desired very short current impulse, and to a relatively wide open adjustment of the needle valve 81. In such cases, the movement of the cam 96 may kick the roller 107 and arm 99 away from the cam; and the time that it remains in its clockwise direction may be additionally determined by an inertia weight 169 on the arm 110 below the shaft 100.

These latter functions of the weight 169 and the arm 99 are more fully described in the copending application of Edward G. Beiderman, Serial Number 84,981, filed June 13, 1936, for Improvements in time controlled electric switches, to which reference may be had.

The weld has now been effected and the welding current broken and the upward movement of the plunger 88 causes the arm 94 to engage the stop 128 and raise the valve 124 to its upper position described. Thereupon fluid pressure from the source 17 flows by way of the conduit 130 through the ducts 131 and 132, which are now aligned with the neck 138 of the valve, and the fluid pressure flows past the needle valve 135 into the duct 134 and through the conduit 133 to the cylinder 140 of the delayed operation device 139.

This fluid pressure in the cylinder 140 starts the piston 141 to move upwardly at a rate determined by the adjustment of the needle valve 135. At the end of the time interval thus determined, which is the aforesaid cold-hold interval, the upper end of the stem 143 engages the contact arm 147 and moves it out of engagement with the contact 151.

It will be observed from the foregoing description of the energizing circuit of the relay 153, that its winding 154 is energized through the contact 151, but is maintained through the contact 152, so the disengaging of the contact 151 effects no change. Continued upward movement of the stem 143 causes the adjustable screw 170 on the arm 147 to engage the arm 148 and move it out of engagement with the contact 152.

This effects de-energization of the relay winding 154, and of its contacts at 156 and 157, which respectively open the maintaining circuit for the relay and effect de-energization of the winding 47 and the winding 33.

The magnetic valve 14 thereupon resets under the action of the spring 20 and exhausts the conduit 26 out at the duct 31, which is now aligned with the ducts 29 and 30, and also exhausts the cylinder 6 through the now aligned ducts 21, 24, 22 and 25, which permits the spring 9 to raise the electrode 5 preparatory to another operation.

The de-energization of the winding 47 allows the spring 46 to reset the magnetic valve head 36 to the position illustrated in Fig. 1, whereupon the cylinder 69 exhausts backwardly through the conduit 57, duct 51, recess 55 and out at the duct 52 and conduit 58; and also exhausts the cylinder 60 outward through the duct 59 and conduit 56, duct 53, recess 55, duct 52 and conduit 58, causing both the plunger 88 and the piston 70 and valve piston 62 to reset to their original position.

When the plunger 88 thus resets it permits the spring 129 to restore the valve 124, whereupon the piston 141 of the delayed operation device 139 is moved downwardly by the spring 146 and exhausts the cylinder 140 through the duct 142, conduit 133, duct 134, past a needle valve 171 controlling the flow, thence through the duct 136, and out to atmosphere. The spring 144 thus moves piston 140 downwardly at a rate controlled by the needle valve 171, developing a time interval which is the aforesaid delay interval. As the piston 141 moves downwardly it first effects engagement of the arm 148 with the contact 152, but this effects no change inasmuch as the contact 152 is in the now open maintaining circuit for the relay winding 154. When, however, the piston moves downwardly still farther and at the end of the delay time interval, it permits the arm 147 to engage the contact 151.

At this time, if the operator's contactor 158 had been held closed, which would be the case if a succession of welds was wanted, the moment the contact 151 is engaged, the relay winding 154 would be again energized by the circuit above described, and the parts will go through another cycle of operation. A succeeding cycle, as will now be understood, cannot be effected until the piston 141 of the device 139 has reset, at the end of the delay time interval.

The device therefore, as will now be clear, controls and predetermines the cold-hold time interval during which the electrodes 4 and 5 remain engaged with the work after the welding current is interrupted, and the delay time interval which must elapse after one operation has been performed before another may be performed. It is also apparent that the cold-hold interval and the delay interval may be different, inasmuch as they are adjusted one independently of the other by the needle valves 135 and 171.

It is to be noted that, in practice, the conduit 26, as well as the conduits 28, 23 and 18, may be of relatively great length; and that by providing a separate valve 27 for exhausting the device 61 and the main cylinder 69, these parts can reset in a very short interval of time independently of the exhaust of the said conduits, so that the maximum number of operations per minute is possible with substantially unappreciable delay due to the exhausting of the air from the parts mentioned.

In the embodiment of my invention illustrated in Figs. 4 to 6 inclusive, the valve operated by the welding current contactor, (namely the valve 124, of Fig. 1) is dispensed with, and the functions thereof, namely the control of the fluid pressure to the delayed operation device 139, both for timing the cold-hold and the delay, are performed by a magnetic valve.

In view of the fact that the system generally is otherwise similar to that of Figs. 1 to 3, it is believed that this modification will be understood from a description of the operation thereof without a detailed description, in advance, of the parts thereof.

Referring therefore to Figs. 4, 5 and 6, when the operator's contactor 158, which again is preferably a normally open contactor, is closed, current flows from the supply main 159 through the winding 154 of the relay 153, through the contactor 158, by wire 160 to contactor arm 147, through the contact 151 engaged with the arm, and by wires 161 and 162 to the other supply main 163, thereby operating the relay 153, causing it to close contacts at 156 and 157. A maintaining circuit is thereupon made for the winding 154 from the main 159 through the winding 154 directly to and through the contacts 156 by wire 165 through the contactor arm 148 through the contact 152 engaged therewith, and by the wire 162 to the main 163, so that the relay will remain operated even if the operator's contactor 158 is opened.

It will now be observed that again, as in the form of Fig. 1, closing of the relay is effected through the contact 151 and it is maintained closed through the contact 152.

Upon operation of the relay, current flows through from the main 163 through the closed contacts 157, by wire 168 and wire 167, to the winding 33 of the magnetic valve 14 and back by wires 166 and 172 to the supply main 159, operating the valve 14.

This, as described for the form of Fig. 1, admits fluid pressure from the source 17 to the cylinder 6, effecting engagement of the electrodes 4 and 5 with the work 3.

The back pressure from the cylinder 6 builds up in the conduit 26, which is connected to a magnetic valve 173. This valve is of similar structure to the valve 27, of Fig. 1, but has a different arrangement of ducts and recesses. It comprises radial ducts 174 to 181 inclusive, and three recesses in the head 182 thereof indicated at 183, 184 and 185, with which the axial terminations of the said ducts communicate in the following arrangement. In the normal position of the valve, illustrated in Fig. 4, the recess 183 effects communication between the ducts 180 and 181, and the recess 185 effects communication between the ducts 175 and 177. In the operated position of the valve, illustrated in Fig 5, the recess 185 effects communication between the ducts 174, 175 and 176, and the recess 184 effects communication between the ducts 178 and 179.

Referring again to Fig. 4, the back pressure in the conduit 26 communicating with the duct 177 and the recess 185 communicates the pressure through the duct 175 to the conduit 56 and thence to the underside of the piston valve 62 of the minimum pressure device 61. When this pressure reaches the predetermined value, for which the spring 64 is adjusted, the valve 62 rises and admits the pressure to the conduit 68.

The pressure in the conduit 68 is communicated to the space 73 through the duct 71, and thence by way of duct 82 to the cylinder 69 under the lower piston 70 causing the piston to move upwardly with a quick movement until the duct 77 is covered by the lower piston 70. Thereafter, the movement of the piston is controlled by fluid pressure admitted through the duct 79 under the control of the needle valve 81, which thereby controls the rate of movement of the pistons. The upward movement of the pistons raises the plunger 88, as described for Fig. 1, closing and then opening again the contacts 113—115 and 114—116 and sending a welding current of timed duration to the electrodes 4 and 5.

In the upper portion of the stroke of the plunger 88, a finger 182, on the plunger, engages an adjustable screw 187 on a pivoted contact arm 188, which is normally held by a spring 189 against a stop 190, and moves the arm to engage a contact 191. Thereupon, current flows from the supply main 159 by a wire 172 through the winding 47, arranged to lift the plunger 43, and by a wire 192 to the contact 191, through the arm 188 and by a wire 193 through the contact arm 147 and contact 151, wires 161 and 162 to the line 163. The plunger 43 is thereby raised, moving the magnetic valve 173 from the position of Fig. 1 to that of Fig. 2, which positions are determined by egagement of a finger 48 on the valve head 182 with stops 49 and 50. The magnetic valve head 182 has thereon an arm 41 carrying the roller 42 engaged by the upper and lower fingers 44 and 45 of the plunger, and the arm 41 outwardly of the roller has an extension 194 thereon to which a flexible electric wire 195 is connected.

When the valve is operated by the plunger 44, as described, rotating the valve head 182, the extension 194 moves up to the dotted line position 194A, and engages a stationary contact 196. A maintaining circuit for the winding 47 is thereby made, the current now flowing from the line 159 through the winding 47, contact 196, thence through the arm 194, through the wire 195 and thence by the wire 168 and contacts 157 to the line 163.

The operated position for the valve 173, shown in Fig. 2, immediately exhausts the contactor cylinder 69 and the minimum pressure device 61 as follows. The cylinder 69 communicates by conduit 57 with the duct 174 of the valve which is now connected through the recess 185 with the duct 176, which is connected to an exhaust conduit 197. The conduit 56 of the minimum pressure device 61 similarly exhausts through the duct 175, recess 185 and the exhaust conduit 197.

By means of this exhaust, the plunger 88 and the piston valve 62 immediately reset. Although downward movement of the plunger 88 again opens the contact at 191, the plunger 43 is held up by the maintaining circuit for its winding 47, as described.

When the magnetic valve 173 moves to its operated position, fluid pressure from the source 17 flows by a conduit 198 to the duct 178 and thence through the recess 184 to the duct 179 and out at conduit 199 and through a flow-port 200 controlled by a needle valve 201, and into a conduit 202, and thence through a duct 142 into the cylinder 140 of the delayed operation device 139 below the piston 141 thereof.

This is the same cold-hold and delay timing device as that of Fig. 1. Under the control of the needle valve 201, which times its rate of movement, the piston 141 moves upwardly and the stem 143, after a short preliminary movement, engages the arm 147 and opens the contact 151. No change is effected thereby and at the end of the time interval for which the valve 201 is set, the adjustable screw 170 on the arm 147 engages the arm 148 and disengages it from the contact 152.

This effects de-energization both of the winding 154 of the relay 153 and of the winding 47 of the magnetic valve 173, and these elements of the system reset, and the resetting of the relay 153 also effects de-energization of the winding 33, and the magnetic valve 14 resets.

The parts are now in their original positions except for the timing device 139, of which the piston 141 is in the upper position. The spring 146 of that device now moves the piston 141 downwardly and exhausts the fluid from the cylinder 140 downwardly through the conduit 202, through a flow control port 203 under the control of a needle valve 204 into a conduit 206 connected with the duct 180, and the exhaust therefrom occurring by way of the duct 180, recess 183, duct 181, and an exhaust conduit 205 connected to the duct 181.

As the piston 141 descends, it first releases the arm 148 to engage the contact 152 and at, or near, the end of its stroke, releases the arm 147 to engage the contact 151, and the parts are ready for another operation.

If the operator's contactor 158 has been maintained closed, immediately upon engagement of the contact 151, the parts will repeat their cycle but if the contactor 158 has been opened, the parts will remain at rest until it is again closed.

It will be observed that in mode of operation, this form distinguishes from that of Fig. 1, by the resetting of the plunger 88 and the minimum pressure valve piston 61, immediately after the plunger 88 has completed its stroke.

My invention is not limited to the exact details of construction illustrated and described. Changes and modifications may be made within the spirit of my invention without sacrificing its advantages and within the scope of the appended claims.

I claim:

1. In an electro-fluid pressure system, a source of electric current, an expansible fluid pressure chamber having a pressure movable wall, a source of fluid pressure and fluid pressure supply conduit means communicating with the pressure source and the chamber to supply fluid pressure thereto at a substantially unretarded rate, to effect a quick initial substantially unretarded movement of the wall, an electric contactor comprising contacts, means operable by said initial movement to close the contacts, valve means operable by said initial movement to throttle the rate of fluid pressure supplied to the chamber to effect subsequent retarded movement of the wall, and means operable by said retarded movement to effect opening of the contacts at the end of a predetermined time interval of retarded movement.

2. In an electro-fluid pressure system, a fluid pressure cylinder and a movable piston therein, fluid pressure supply conduit means communicating with the cylinder to supply fluid pressure thereto at a substantially unretarded rate and at a retarded rate through ports in the cylinder wall, to effect a quick initial substantially unretarded movement of the piston, an electric contactor comprising contacts, means operable by the said initial movement of the piston to close the contacts, the moving piston covering the unretarded flow port by said initial movement to effect supplying of fluid pressure to the cylinder through the retarded flow port to effect subsequent retarded movement of the piston, and means operable by said retarded movement to effect opening of the contacts at the end of a predetermined time interval of retarded movement.

3. In an electro-fluid pressure system, a source of electric current, a source of fluid pressure, an expansible fluid pressure chamber having a movable wall, fluid pressure supply conduit means communicating with the pressure source and the chamber to supply fluid pressure thereto at a substantially unretarded rate, to effect a quick initial substantially unretarded movement of the wall, an electric contactor comprising contacts, means operable by said initial movement to close the contacts, means operable responsive to said initial movement to reduce the rate of fluid pressure supplied to the chamber to effect subsequent retarded movement of the wall, and means operable by said retarded wall movement to effect opening of the contacts at the end of a predetermined time interval of said retarded movement.

HARRY R. CANFIELD.